(12) United States Patent
Cui

(10) Patent No.: US 12,029,199 B2
(45) Date of Patent: Jul. 9, 2024

(54) ASSEMBLED PET RACK HAVING FAST DISASSEMBLY AND ASSEMBLY

(71) Applicant: Zhanke Cui, Shenzhen (CN)

(72) Inventor: Zhanke Cui, Shenzhen (CN)

(73) Assignee: Zhanke Cui, Shenzhen (CN)

( * ) Notice: Subject to any disclaimer, the term of this patent is extended or adjusted under 35 U.S.C. 154(b) by 248 days.

(21) Appl. No.: 17/669,387

(22) Filed: Feb. 11, 2022

(65) Prior Publication Data

US 2023/0059223 A1 Feb. 23, 2023

(30) Foreign Application Priority Data

Aug. 18, 2021 (CN) .......................... 202110949270.7
Aug. 18, 2021 (CN) .......................... 202110950561.8

(51) Int. Cl.
*A01K 15/02* (2006.01)
*A01K 1/03* (2006.01)
*A01K 1/035* (2006.01)

(52) U.S. Cl.
CPC .............. *A01K 15/02* (2013.01); *A01K 1/033* (2013.01); *A01K 1/035* (2013.01)

(58) Field of Classification Search
CPC ........ A01K 15/02; A01K 1/033; A01K 1/035; A47B 47/0008; A47B 47/0083
USPC ................. 108/91, 92, 180, 190, 153.1, 154
See application file for complete search history.

(56) References Cited

U.S. PATENT DOCUMENTS

| | | | | |
|---|---|---|---|---|
| 730,984 A | * | 6/1903 | Sues ..................... | A47B 47/042 108/180 |
| 1,590,921 A | * | 6/1926 | Wittliff ................... | F16B 12/18 248/188.91 |
| 1,710,911 A | * | 4/1929 | Wittliff ................... | F16B 12/18 297/449.1 |
| 1,752,545 A | * | 4/1930 | Wittliff ................... | F16B 12/18 248/440 |
| 1,885,664 A | * | 11/1932 | Wittliff ................... | F16B 12/18 248/188.91 |

(Continued)

FOREIGN PATENT DOCUMENTS

| | | | | |
|---|---|---|---|---|
| DE | 20217336 U1 | * | 2/2003 | ............. A47B 13/02 |
| EP | 3718434 A1 | * | 10/2020 | |

*Primary Examiner* — Jose V Chen
(74) *Attorney, Agent, or Firm* — Nitin Kaushik

(57) ABSTRACT

The present disclosure relates to an assembled pet rack having fast disassembly and assembly, comprising: a bottom member; a top member; a supporting member; a separating member arranged on the supporting member for forming multiple spaces for pets to rest; and a plurality of drawstring members, whose one end is fixedly connected with the bottom member, and the other end penetrates the support member and the separating member and then is fixedly connected with the top member for integrally connecting all the above members. In the present disclosure, the drawstring members connect in series the components of the pet rack according to the correct design, thus to complete the correct assembly more quickly and simply, thereby achieving fast disassembly and assembly. Besides, the drawstring members can be staggered on the same plane without disconnecting the drawstring member separately, so the assembled method is fast and diverse, which improves the practicability.

9 Claims, 12 Drawing Sheets

(56) References Cited

U.S. PATENT DOCUMENTS

| | | | | |
|---|---|---|---|---|
| 1,914,706 A | * | 6/1933 | Wittliff | F16B 12/18 248/188.91 |
| 3,223,054 A | * | 12/1965 | Novak | A47B 3/10 108/186 |
| 3,307,505 A | * | 3/1967 | Windross | A47B 47/042 108/180 |
| 3,632,179 A | * | 1/1972 | Vredevoogd | A47C 4/02 248/188.91 |
| 3,730,601 A | * | 5/1973 | Misenheimer, III | A47B 87/0215 108/190 |
| 3,756,168 A | * | 9/1973 | Bushyhead | A47F 5/10 108/106 |
| 3,783,801 A | * | 1/1974 | Engman | A47B 87/0215 108/190 |
| 3,831,533 A | * | 8/1974 | Kellogg | A47B 87/0215 108/101 |
| 3,856,424 A | * | 12/1974 | Beck, Jr. | F16B 43/00 403/408.1 |
| 4,044,448 A | * | 8/1977 | Watanabe | A47C 19/021 108/180 |
| 4,073,241 A | * | 2/1978 | Wheeler | A47B 87/0207 52/DIG. 9 |
| 4,501,512 A | * | 2/1985 | Hiltz | F16B 12/18 403/170 |
| 4,706,573 A | * | 11/1987 | Sielaff | F16B 12/18 108/190 |
| 5,881,653 A | * | 3/1999 | Pfister | A47B 87/0223 211/188 |
| 5,909,863 A | * | 6/1999 | Mansfield | A47B 87/0215 411/389 |
| 5,941,183 A | * | 8/1999 | Ming-Shun | A47B 3/06 108/190 |
| 6,123,035 A | * | 9/2000 | Pfister | A47B 87/0223 403/309 |
| 6,908,000 B2 | * | 6/2005 | Craft | A47B 81/002 211/144 |
| 6,948,435 B1 | * | 9/2005 | Sheng | A47B 47/0016 108/190 |
| 7,028,620 B1 | * | 4/2006 | Lyndon | A47B 87/0207 108/190 |
| D931,643 S | * | 9/2021 | Li | D6/375 |
| 2019/0254424 A1 | * | 8/2019 | Rassat | F16B 12/10 |
| 2021/0112980 A1 | * | 4/2021 | Davis | A47B 87/0223 |

\* cited by examiner

ASSEMBLED PET RACK HAVING FAST DISASSEMBLY AND ASSEMBLY

TECHNICAL FIELD

The present disclosure relates to the technical field of pet products, and in particular to an assembled pet rack having fast disassembly and assembly.

RELATED ART

Pets refer to creatures that people keep for spiritual purposes rather than economic purposes. The pets mainly include fish, reptiles, amphibians, insects, etc., which are used for companionship, and relieving people's mental stresses.

In order to provide space for pets to play heartily and release their natures to grow healthily while minimizing damages to furniture, many pet racks are currently used in pet-loving families. Cats are the most common pets that people keep, they are not only adorable but also lively and active, while they are easy to climb interior decorations to cause damages. Therefore, it is necessary to provide a cat climbing rack that can provide space for cats to play, exercise and rest.

Components and parts of the existing pet racks such as cat climbing racks, cat trees or other similar products are separated, when assembling, they are assembled and fixed one by one through screws and bolts. The entire assembly process is complex, slow, time-consuming and labor-intensive, sometimes special tools are required for assembling and errors easily occur as well, results in that customers mistakenly think that there are malfunctions with the products, which is easily to cause bad customer experiences. Besides, there are some technical requirements for assemblers, so that many customers will ask professionals for installations, which will increase the customers' expenditure costs, damage the customers' experiences and reduce the customers' purchase rates.

SUMMARY

A purpose of the present disclosure is to provide an assembled pet rack having fast disassembly and assembly to solve the above-mentioned problems in the related art.

To achieve the above purpose, the present disclosure provides the following technical solution.

An assembled pet rack having fast disassembly and assembly, comprising: a bottom member;

a top member; a supporting member, whose one end is connected with the bottom member, and the other end is connected with the top member; a separating member arranged on the supporting member for forming multiple spaces on the supporting member for pets to rest; and a plurality of drawstring members, whose one end is fixedly connected with the bottom member, and the other end penetrates the support member and the separating member and then is fixedly connected with the top member for integrally connecting the bottom member, the supporting member, the separating member and the top member.

As a further technical solution of the present disclosure, the drawstring member comprises a leading rope, whose one end or both ends are provided with a limiter.

As a further technical solution of the present disclosure, the bottom member comprises: a bottom plate for supporting; and a locking unit, which is a single lock for locking the drawstring member individually or a ratchet lock for locking the plurality of drawstring members synchronously.

As a further technical solution of the present disclosure, the single lock comprises: a first bottom plate plug; a second bottom plate plug matched with the first bottom plate plug; a tension bolt arranged within the first bottom plate plug, wherein the tension bolt is matched with the drawstring member; an adjusting nut threadedly connected with the tension bolt for adjusting the tightness of the drawstring member through adjusting a position of the tension bolt; and a clamping nut sleeved outside the tension bolt and threadedly connected with the tension bolt for clamping the drawstring member.

As a further technical solution of the present disclosure, the ratchet lock comprises: a third bottom plate plug, whose side surface is provided with a plurality of guiding holes for the drawstring member to pass through; a fourth bottom plate plug matched with the third bottom plate plug; a bottom plate plug reinforcement member arranged within the bottom plate plug for the drawstring member to pass through; and a locking member arranged within the bottom plate for cooperating with the drawstring member and tightening and fixing the drawstring member, wherein the locking member comprises: a first base fixedly arranged within the bottom plate, wherein the first base is provided with a lateral guide rail; a second base slidably connected to the first base through the lateral guide rail, wherein the second base is provided with a longitudinal guide rail; a third base slidably connected to the second base through the longitudinal guide rail for laterally or longitudinally sliding relative to the first base; a winder rotatably arranged between the second base and the third base, wherein the winder is connected to the limiter at one end of the leading rope; a driving gear meshed with the winder, wherein the driving gear is rotatably arranged between the second base and the third base; and a one-way rotary limiter matched with the winder, wherein the one-way rotary limiter is arranged between the second base and the third base for restricting the winder to rotate unidirectionally.

As a further technical solution of the present disclosure, the top member comprises: a top plate; and a top fixing unit arranged on the top plate, wherein the top fixing unit is a first fixer or a second fixer for fixing the drawstring member.

As a further technical solution of the present disclosure, the first fixer comprises: a first top plate plug matched with the limiter; a second top plate plug matched with the first top plate plug; and a top plate plug reinforcement member arranged within the first top plate plug, wherein the top plate plug reinforcement member is connected to the limiter, wherein the second fixer comprises: a third top plate plug; a fourth top plate plug matched with the third top plug; a limiting connector arranged on the third top plate plug for cooperating with the drawstring member; a pressing block fixedly connected with the limiting connector through a fixing screw; and a plug cap matched with the third top plate plug, wherein when the limiting connector and the drawstring member are vertically connected but not laterally connected, the limiting connector lies flat on the third top plate plug; and when the limiting connector is laterally connected with the drawstring member and the pressing block is also pressedly connected with the drawstring member extending from another extended module, the limiting connector is erected and passes through inside of the third top plate plug under the action of the drawstring member at two ends.

As a further technical solution of the present disclosure, the supporting member comprises: a plurality of long tubes;

a plurality of short tubes; and an intermediate connecting unit for connecting the adjacent long tubes, the adjacent short tubes or the long tube and the short tube, wherein the intermediate connecting unit comprises: a male plug; a female plug matched with the male plug; a first turning plug; a second turning plug matched with the first turning plug; a plurality of side-holes formed on side surface of the first turning plug; a side-hole reinforcement member arranged within the side-holes; and a turning plug reinforcement member arranged within the first turning plugs, wherein a side surface of the turning plug reinforcement member are provided with a through hole for the drawstring members to pass through and for guiding the drawstring members to turn.

As a further technical solution of the present disclosure, the separating member comprises: a first separator installed between the adjacent long tubes; a second separator installed between the adjacent short tubes; a third separator installed between the long tube and the short tube.

As a further technical solution of the present disclosure, the bottom member comprises: a bottom plate; and fixing units arranged within the bottom plate for fixing the drawstring member, wherein the top member comprises: a top plate; and the fixing units arranged within the top plate for fixing the drawstring member.

As a further technical solution of the present disclosure, the supporting member comprises: a plurality of long tubes; a plurality of short tubes for matching with the plurality of the long tubes; and an assembled unit, which is a first intermediate connecting unit or a second intermediate connecting unit for connecting the long tubes and the short tubes.

As a further technical solution of the present disclosure, the first intermediate connecting unit comprises: a hollow screw; a first platen plug sleeved outside of both ends of the hollow screw for matching with the long tubes and the short tubes; and a sleeve nut arranged on both ends of the hollow screw and threadedly connected with the hollow screw for fixing the first platen plug.

As a further technical solution of the present disclosure, the second intermediate connecting unit comprises a straight connector for straight connection and a turning connector for turning connection, wherein the straight connector comprises: a male plug, whose one end is matched with the separating member; and a female plug, whose one end is matched with the male plug, wherein the turning connector comprises: a third turn plug, whose one end is matched with the separating member; and a four turn plug, whose one end is matched with the third turn plug.

Compared with the related art, the present disclosure has the following beneficial effects.

1. Multiple drawstring members that meet the material requirements connect in series the components of the pet rack according to the correct design, which is in a semi-loose state but will not be spread, therefore it is convenient to be folded and packed in a packing box. When assembling, the entire product is taken out of the packing box and the drawstring members are properly tightened to make each component close, and then each component is tightly clamped and tighten by the drawstring members, thus to complete the correct assembly more quickly and easily, thereby achieving rapid retraction and release.
2. The separating member can be staggered on the same plane without disconnecting the drawstring member separately, so the assembled method is fast and diverse, which improves the practicability.
3. When assembling, only the corresponding drawstring members are tightly fastened and matched with the fixed structure designed on the product, in this way, the whole product is assembled. The whole process is simple, fast, time-saving and labor-saving, so there will be no misplacement of the product components and parts. Besides, the assembly cost of the product is reduced, which can save customers' money and improve customers' satisfactions.

Figure 1:
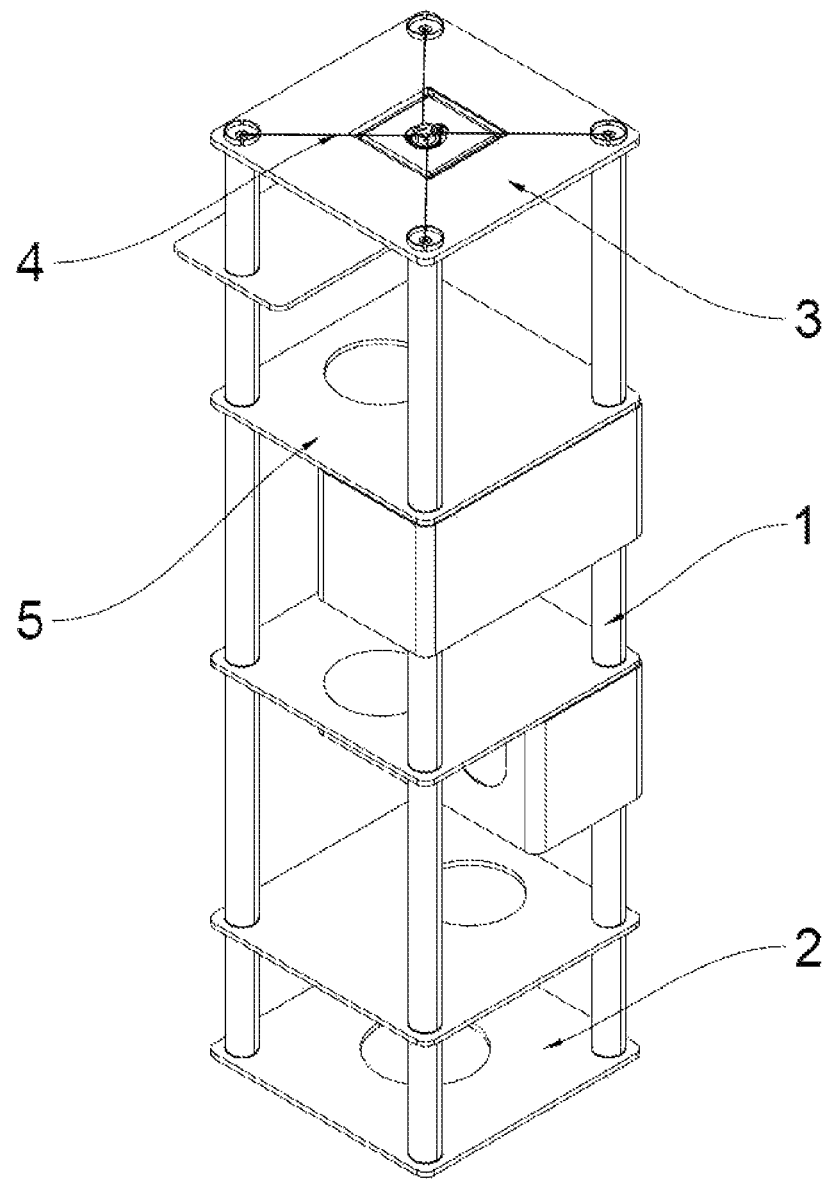
FIG. 1 is a schematic structure view of an assembled pet rack having fast disassembly and assembly.

Reference numbers: supporting member 1, long tube 11, short tube 12, intermediate connecting unit 13, male plug 13A, female plug 13B, first turning plug 13C, second turning plug 13D, side-hole reinforcement member 13E, turning plug reinforcement member 13F, hollow screw 13G, first platen plug 13H, sleeve nut 131, third turning plug 13J, four turning plug 13K; top member 2, top plate 21, top fixing unit 22, first top plate plug 22A, second top plate plug 22B, top plate plug reinforcement member 22C, third top plate plug 22D, four top plate plug 22E, limiting connector 22F, plug cap 22G, pressing block 22H, fixing screw 221, fixing unit 22J, hollow sleeve nut 22K, fifth top plate plug 22L; bottom member 3, bottom plate 31, single lock 32, first bottom plate plug 32A, second bottom plate plug 32B, tension bolt 32C, adjusting nut 32D, clamping nut 32E, ratchet lock 33, third bottom plate plug 33A, four bottom plate plug 33B, bottom plate plug reinforcement member 33C, locking member 33D, first base 33D1, second base 33D2, third base 33D3, winder stationary shaft 33D4, driving gear stationary shaft 33D5, driving gear 33D6, winder 33D7, one-way rotary limiter 33D8; drawstring member 4, leading rope 41, limiter 42; separating member 5, first separator 51, second separator 53, third separator 52; lateral guide rail 61, longitudinal guide rail 62, side-hole 63, through hole 64.

PREFERRED EMBODIMENTS OF THE PRESENT DISCLOSURE

The technical solutions in the embodiments of the present disclosure will be clearly and completely described below with reference to the accompanying drawings.

Figure 2:
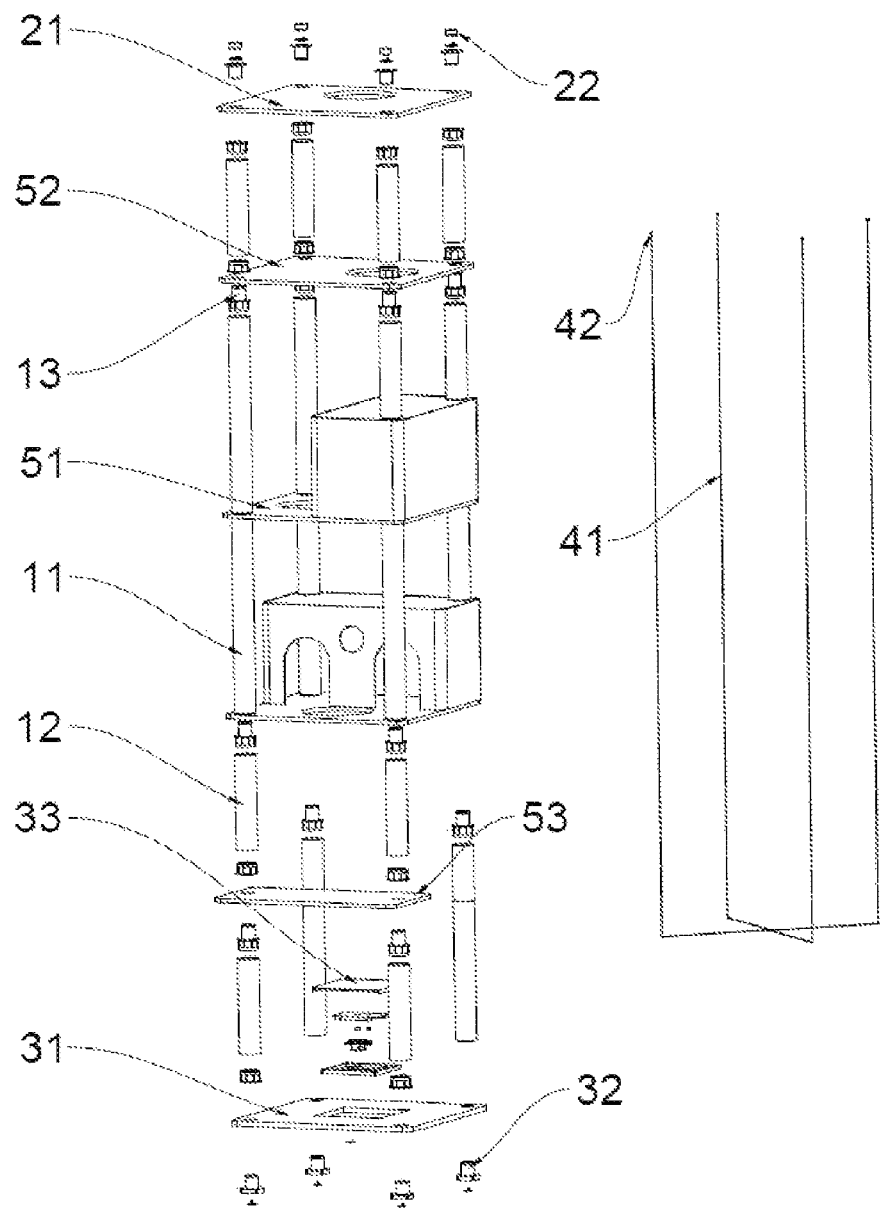
FIG. 2 an exploded view of the assembled pet rack having fast disassembly and assembly.
Figure 3:
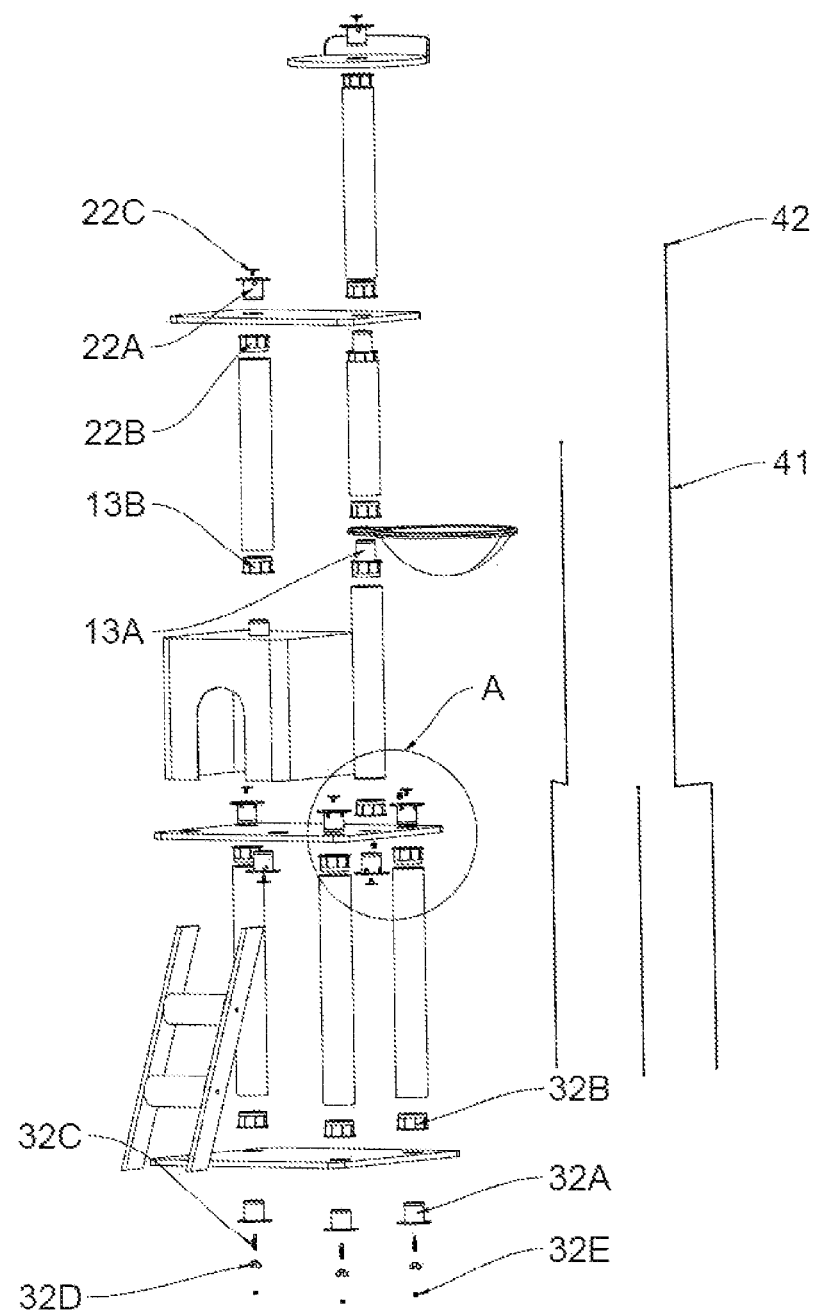
FIG. 3 is an exploded view of the assembled pet rack having fast disassembly and assembly according to another embodiment.

As shown in FIG. 1 to FIG. 3, the embodiment of the present disclosure is achieved by providing an assembled pet rack having fast disassembly and assembly comprising: a bottom member 3; a top member 2; a supporting member 1, whose one end is connected with the bottom member 3, and the other end is connected with the top member 2; a separating member 5 arranged on the supporting member 1 for forming multiple spaces on the supporting member 1 for pets to rest; and a plurality of drawstring members 4, whose one end is fixedly connected with the bottom member 3, the other end penetrates the support member 1 and the separating member 5 and then is fixedly connected with the top member 2 for integrally connecting the bottom member 3, the supporting member 1, the separating member 5 and the top member 2.

In practical application of the present disclosure, the supporting member 1 with the separating member 5 is fixedly connected with the bottom member 3 and the top member 2 by setting the drawstring member 4. When assembling, one can barely make the drawstring member 4 pass through the supporting member 1, then connect both ends of the drawstring member 4 with the bottom member 3 and the top member 2 respectively, and last lock and fix the connection, the assembly of the pet rack is done. In order to ensure supporting stability, multiple supporting members 1 are provided, as shown in FIG. 2, four supporting members 1 are provided and arranged on the same straight line. As shown in FIG. 3, the supporting member 1 can also be staggered, that is, three supporting members 1 are arranged at the bottom, two supporting members 1 are arranged in the middle, and one supporting member 1 is arranged at the top. As long as the structure is stable, a specific shape is not limited here. With such design, the connection that multiple components are connected and fixed one by one at present is avoided, thereby improving the disassembly and assembly efficiency and making it more practical.

As shown in FIG. 2 and FIG. 3, as a preferred embodiment of the present disclosure, the drawstring member 4 comprises a leading rope 41, whose one end or both ends are provided with a limiter 42.

In one case of this embodiment, the limiter 42 is just arranged at one end of the leading rope 41. During installation, the limiter 42 at one end of the leading rope 41 is fixedly connected with the top member 2, the other end of the leading rope 41 passes through the supporting member 1 and the separating member 5 and then is connected with the bottom member 3 at the other side and finally is locked and fixed to complete the assembly. The strength of the leading rope 41 is required to meet the usage requirements, which can be made of steel wires, drawstrings or chains of various materials.

As shown in FIG. 2, as another preferred embodiment of the present disclosure, the bottom member 3 comprises: a bottom plate 31 for supporting; and a locking unit, which is a single lock 32 for locking the drawstring member 4 individually or a ratchet lock 33 for locking the plurality of drawstring members 4 synchronously.

In one case of this embodiment, the single lock 32 is used for individually locking a single drawstring member 4 or the ratchet lock 33 is used for locking all the drawstring members 4 synchronously according to the costs and the usage requirements, thus the installation efficiency is improved in the case of ensuring the stable connection.

Figure 5:
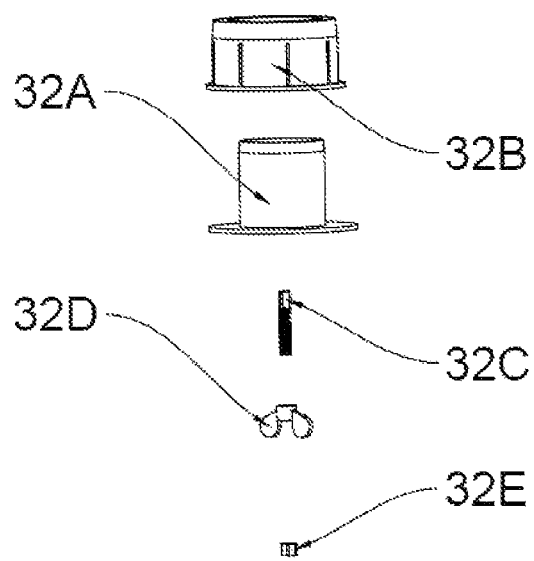
FIG. 5 is an exploded view of a ratchet lock of the assembled pet rack having fast disassembly and assembly according to another embodiment.

As shown in FIG. 3 and FIG. 5, as another preferred embodiment of the present disclosure, the single lock 32 comprises: a first bottom plate plug 32A; a second bottom plate plug 32B matched with the first bottom plate plug 32A; a tension bolt 32C arranged within the first bottom plate plug 32A, wherein the tension bolt 32C is matched with the drawstring member 4; an adjusting nut 32D threadedly connected with the tension bolt 32C for adjusting the tightness of the drawstring member 4 through adjusting a position of the tension bolt 32C; and a clamping nut 32E sleeved outside the tension bolt 32C and threadedly connected with the tension bolt 32C for clamping the drawstring member 4.

In one case of this embodiment, during installation, the first bottom plate plug 32A and the second bottom plate plug 32B are matched and arranged on the bottom plate 31. The leading rope 41 passes through the second bottom plate plug 32B and first bottom plate plug 32B within the bottom plate 31 to connect with the tension bolt 32C and then is tightly clamped through the clamping nut 32E. The position of the tension bolt 32C is adjusted by adjusting the adjusting nut 32D, thus to adjust the tightness of the leading rope 41, and finally, an appropriate tension strength is adjusted to ensure the stable assembly of the entire product.

Figure 6:
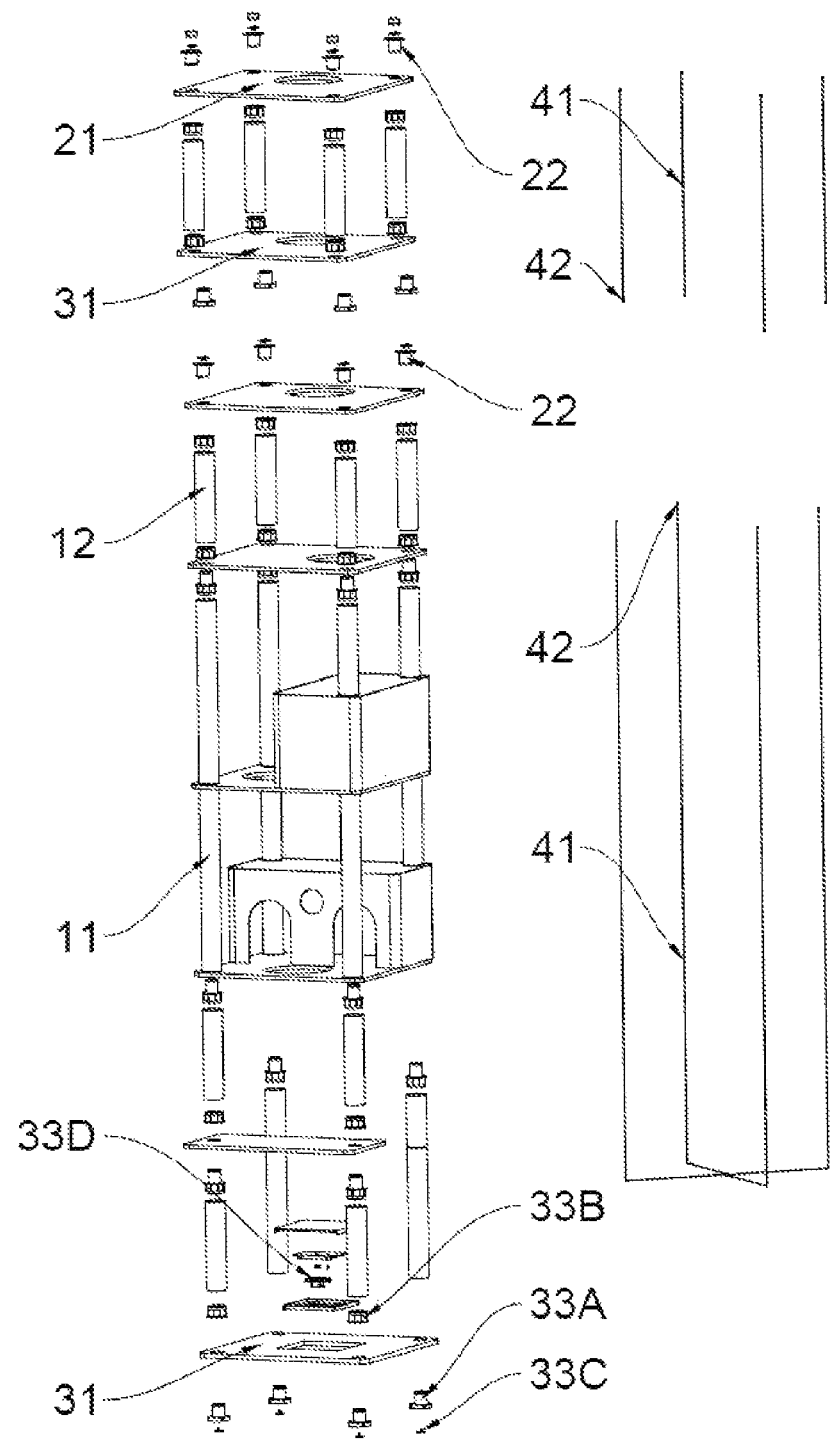
FIG. 6 is an exploded view of the assembled pet rack having fast disassembly and assembly according to another embodiment.
Figure 8:
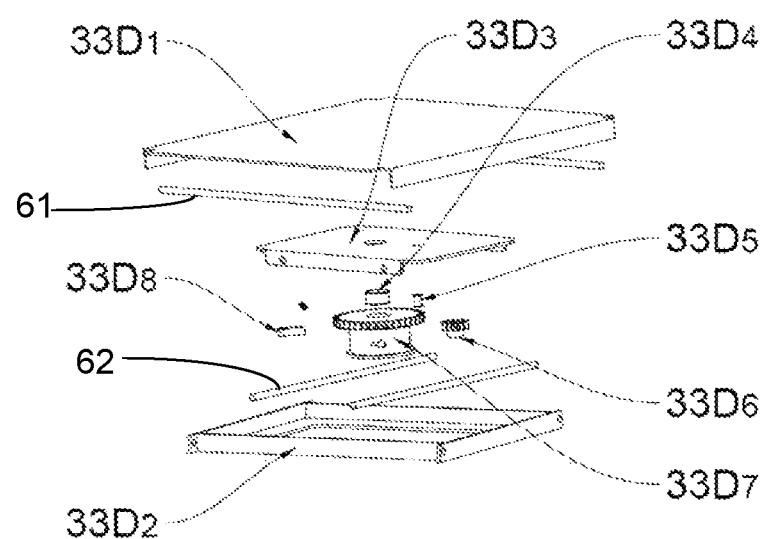
FIG. 8 is an exploded view of a locking member in the assembled pet rack having fast disassembly and assembly.

As shown in FIG. 2, FIG. 6 and FIG. 8, as another preferred embodiment of the present disclosure, the ratchet lock 33 comprises:

a third bottom plate plug 33A, whose side surface is provided with a plurality of guiding holes for the drawstring member 4 to pass through;

a fourth bottom plate plug 33B matched with the third bottom plate plug 33A;

a bottom plate plug reinforcement member 33C arranged within the bottom plate plug 33A for the drawstring member 4 to pass through;

a locking member 33D arranged within the bottom plate 31 for cooperating with the drawstring member 4 and tightening and fixing the drawstring member 4, wherein the locking member 33D comprises:

a first base $33D_1$ fixedly arranged within the bottom plate 31, wherein the first base $33D_1$ is provided with a lateral guide rail;

a second base $33D_2$ slidably connected to the first base $33D_1$ through the lateral guide rail, wherein the second base $33D_2$ is provided with a longitudinal guide rail;

a third base $33D_3$ slidably connected to the second base $33D_2$ through the longitudinal guide rail for laterally or longitudinally sliding relative to the first base $33D_1$;

a winder $33D_7$ rotatably arranged between the second base $33D_2$ and the third base $33D_3$, wherein the winder $33D_7$ is connected to the limiter 42 at one end of the leading rope 41;

a driving gear $33D_6$ meshed with the winder $33D_7$, wherein the driving gear $33D_6$ is rotatably arranged between the second base $33D_2$ and the third base $33D_3$;

a one-way rotary limiter $33D_8$ matched with the winder $33D_7$, wherein the one-way rotary limiter $33D_8$ is arranged between the second base 33D$_2$ and the third base 33D$_3$ for restricting the winder 33D$_7$ to rotate unidirectionally.

In one case of this embodiment, the leading rope 41 is turned by arranging the third bottom plate plug 33A and the fourth bottom plate plug 33B to cooperate with the bottom plate plug reinforcing member 33C, so as to cooperate with the locking member 33D for fixing the plurality of leading ropes 41 synchronously, and the operation is more convenient. In order to ensure the rotatory stability of the winder 33D$_7$ and the driving gear 33D$_6$, the winder 33D$_7$ is rotatably connected to the third base 33D$_3$ through a winder stationary shaft 33D$_4$, and the driving gear 33D$_6$ is rotatably connected to the third base 33D$_3$ through a driving gear stationary shaft 33D$_5$. Specifically, the first base 33D$_1$ comprises two lateral guide rails, so the second base 33D$_2$ can move laterally; meanwhile the second base 33D$_2$ comprises two longitudinal guide rails, so the third base 33D$_3$ can move longitudinally. In this way, when multiple guide ropes 41 are simultaneously tightened in multiple directions respectively, the winder 33D$_7$ with gears fixed on the central third base 33D$_3$ can move in any direction, thus to ensure that all leading ropes 41 can be pulled to the same strengths and can be tightened simultaneously. When tightening, the driving gear 33D$_6$ is rotated, and the driving gear 33D$_6$ drives the winder 33D$_7$ to rotate together to tighten the plurality of leading ropes 41 simultaneously. The winder 33D$_7$ can only rotate unidirectionally due to the limitation of the one-way rotary limiter 33D$_8$, thus can realize a stable fixing after tightening. In order to ensure the stable operation of the one-way rotatory limiter 33D$_8$, a spring is installed to cooperate with the one-way rotatory limiter 33D$_8$ to ensure that it stably limits the winder 33D$_7$ to rotate unidirectionally. The one-way rotatory limiter 33D$_8$ can be released, so the pet rack is disassembled easily.

As shown in FIG. 2, as another preferred embodiment of the present disclosure, the top member 2 comprises: a top plate 21; and a top fixing unit 22 arranged on the top plate 21, wherein the top fixing unit 22 is a first fixer or a second fixer for fixing the drawstring member 4.

In one case of this embodiment, the top fixing unit 22 is arranged on the top plate 21, and the drawstring member 4 is fixed through the top fixing unit 22. When the top fixing unit 22 is the second fixer, multiple assembled pet racks can be assembled and expanded, thus the pet racks are easily assembled into different styles and heights according to the usage requirements, which is more practical.

Figure 10:
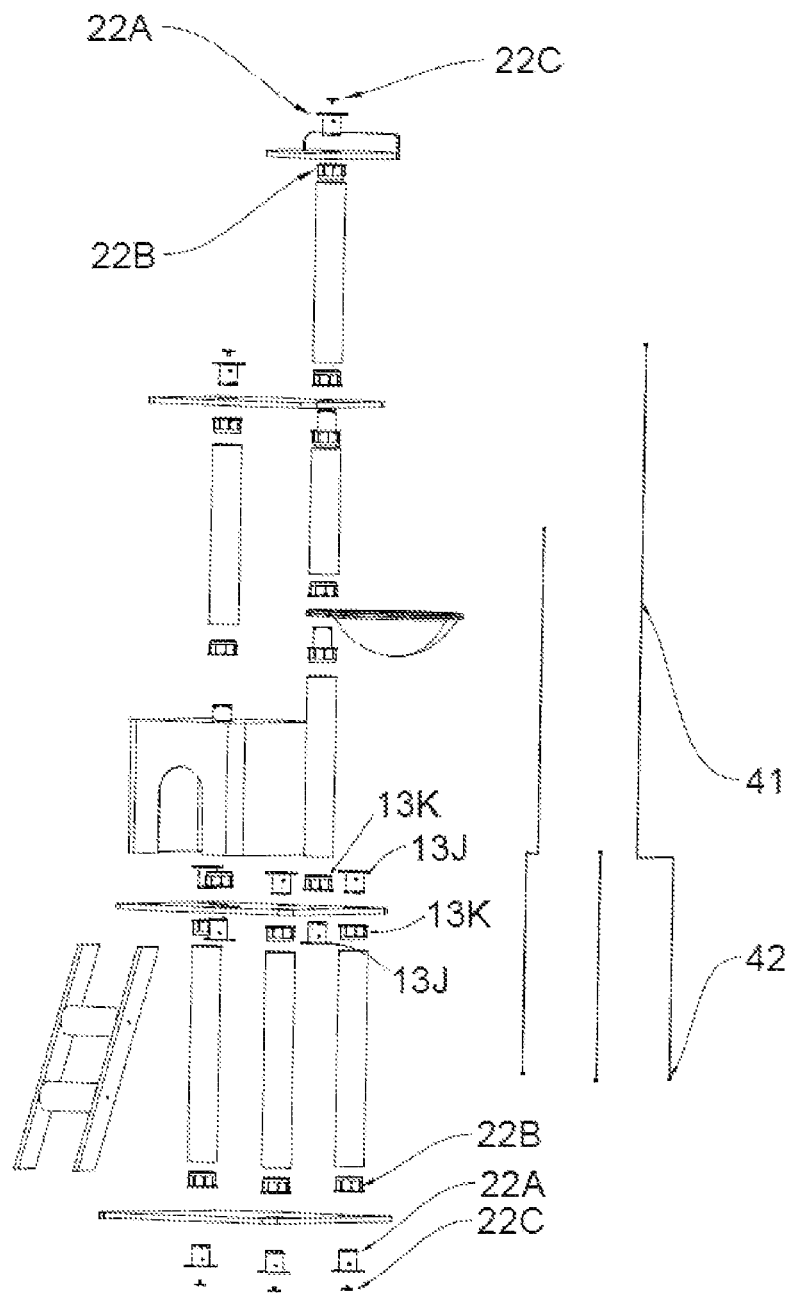
FIG. 10 is an exploded view of the assembled pet rack having fast disassembly and assembly according to another embodiment.

As shown in FIG. 3 and FIG. 10, as another preferred embodiment of the present disclosure, the first fixer comprises: a first top plate plug 22A matched with the limiter 42; a second top plate plug 22B matched with the first top plate plug 22A; and a top plate plug reinforcement member 22C arranged within the first top plate plug 22A, wherein the top plate plug reinforcement member 22C is connected to the limiter 42.

Figure 7:
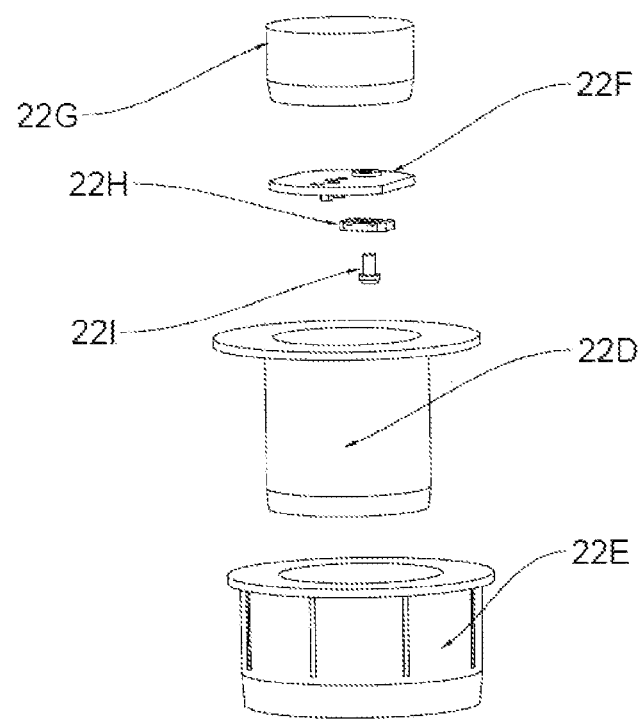
FIG. 7 is an exploded view of a second fixer in the assembled pet rack having fast disassembly and assembly.

As shown in FIG. 7, the second fixer comprises: a third top plate plug 22D; a fourth top plate plug 22E matched with the third top plug 22D; a limiting connector 22F arranged on the third top plate plug 22D for cooperating with the drawstring member 4; a pressing block 22H fixedly connected with the limiting connector 22F through a fixing screw 221; and a plug cap 22G matched with the third top plate plug 22D, wherein when the limiting connector 22F and the drawstring member 4 are vertically connected but not laterally connected, the limiting connector 22F lies flat on the third top plate plug 22D, and when the limiting connector 22F is laterally connected with the drawstring member 4 and the pressing block 22H is also pressedly connected with the drawstring member 4 extending from another extending module, the limiting connector 22F is erected and passes through the inside of the third top plate plug 22D under the action of the drawstring member 4 at two ends.

In one case of this embodiment, when the first fixer is used for assembly, during assembly, the first top plate plug 22A and the second top plate plug 22B are fitted into the top plate 21, then the limiter 42 at one end of the leading rope 41 is connected to the first top plate plug 22A. The arrangement of the top plate plug reinforcement member 22C improves the connection strength, so that the supporting member 1 can be made of various materials, which improves the applicability. When the second fixer is used, the second fixer is used for fixing the top plate 21, thus the fixing requirements are satisfied, the entire product is expanded as well. Specifically, during assembly, the limiting connector 22F on the third top plate plug 22D is erected and then enters into the plugs of the top plate 21 and passed through thereon under the pulling of the leading rope 41 at both ends, in this way, the upper and lower sides of the leading rope 41 can be tightened synchronously, thus the entire product can be tightened and fixed accordingly. That is, after the leading rope 41 is connected, the limiting connector 22F is erected and then enters into the third top plate plug 22D under the pulling of the leading rope 41 so as to be easily connected with the bottom of another pet rack for assembling and expanding. The limiting connector 22F is vertically but not laterally connected to the leading rope 41 while the pressing block 22H at the other end is not pressedly connected with other leading ropes 41, the limiting connector 22F is lying flat, thus the limiting connector 22F cannot enter into the third top plate plug 22D. Please refer to FIG. 6 for details, an expanding unit can be provided at the top, and two similar pet racks can be assembled in this embodiment.

As shown in FIG. 2, as another preferred embodiment of the present disclosure, the supporting member 1 comprises: a plurality of long tubes 11; a plurality of short tubes 12; an intermediate connecting unit 13 for connecting adjacent long tubes 11, adjacent short tubes 12 or long tube 11 and short tube 12.

In one case of the present embodiment, the pet racks of different lengths and different assembled sequences can be arbitrarily spliced and assembled by cooperating with the long tubes 11 and the short tubes 12. Preferably, sisal ropes are wound on the surfaces of the long tubes 11 and the short tubes 12, which facilitate pets to climb and can be scratched and sharpened claws for pets, so as to prevent the pets from scratching furniture, thereby protecting the furniture. Other materials can also be used, as long as it can protect the furniture while facilitating the pets to climb. The arrangement of the intermediate connecting unit 13 ensures the stable connection among the long tubes 11 and the short tubes 12 and the separating member 5, so that the long tubes 11 and the short tubes 12 are coaxially arranged or staggered, thus the arbitrary assembly is achieved, which is more practical.

Figure 4:
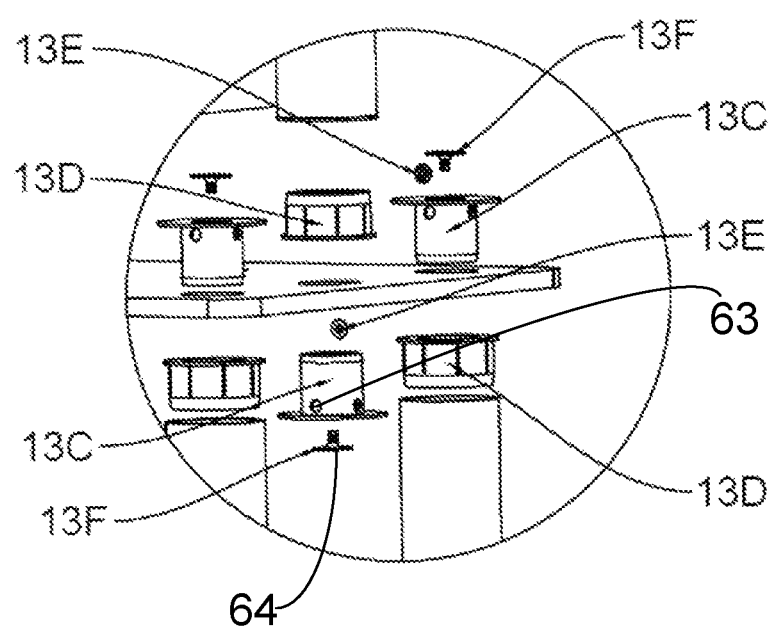
FIG. 4 is an enlarged structural view of Part A in FIG. 3.

As shown in FIG. 3 and FIG. 4, as another preferred embodiment of the present disclosure, the intermediate connecting unit 13 comprises: a male plug 13A; a female plug 13B matched with the male plug 13A; a first turning plug 13C; a second turning plug 13D matched with first turning plug 13C; a plurality of side-holes formed on side surface of the first turning plug 13C; a side-hole reinforcement member 13E arranged within the side-hole; a turning plug reinforcement member 13F arranged within the first turning plug 13C, wherein a side surface of the turning plug reinforcement member 13F is provided with a through hole for the drawstring member 4 to pass through and for guiding the drawstring member 4 to turn.

In one case of this embodiment, when the long tubes 11 and the short tubes 12 are coaxial, the plurality of long tubes 11 and the short tubes 12 are connected to the separating members 5 through the cooperation of the male plug 13A and the female plug 13B, wherein the outer diameters of the male plug 13A and the female plug 13B are matched with that of the long tubes 11 and the short tubes 12 for preliminary positioning. When the adjacent long tubes 11 and the short tubes 12 are staggered, the leading rope 41 is turned by the cooperation of the first turning plug 13C and the second turning plug 13D. As shown in FIG. 4, when the leading rope 41 at the turn extends from top to bottom, it passes through firstly the side-holes of the second turning plug 13D in the middle and the first turning plug 13C in the middle and then enters into the side-holes of the first turning plug 13C on the right and further enters the second turning plug 13D on the right, and continues to pass through, so as to realize the turning. It is convenient to set up pet racks of different shapes and specifications, which is more practical. In addition, the arrangement of the side-hole reinforcement member 13E can improve the connection strengths and avoid affecting the overall strengths when using plastic pet racks.

As shown in FIG. 2, as another preferred embodiment of the present disclosure, the separating member 5 comprises: a first separator 51 installed between the adjacent long tubes 11; a second separator 53 installed between the adjacent short tubes 12; and a third separator 52 installed between the long tube 11 and the short tube 12.

In one case of this embodiment, the number and position of the first separator 51, the second separator 53 and the third separator 52 are subject to the specific heights and shapes of design. Preferably, the first separator 51, the second separator 53 and the third separator 52 are all provided with through-holes that are matched with the intermediate connecting units 13, and surfaces of the first separator 51, the second separator 53 and the third separator 52 are wrapped with flannels that are more comfortable for pets to rest. In addition, rest rooms can also be arranged on the first separator 51, the second separator 53 or the third separator 52 to facilitate pets to enter and rest.

As another preferred embodiment of the present disclosure, the plurality of leading ropes 41 of the drawstring member 4 may have different lengths and shapes, please refer to FIG. 2 and FIG. 3 for details. The leading rope 41 is used for connecting and guiding the overall structure, and the leading ropes 41 finally play the role of tightening and fixing the entire product. The leading ropes 41 can be steel wire or other material ropes that satisfy the usage requirements. When the product is leaved the factory and packed in the packing box, the components of the entire product are in a semi-loose state but will not scattered under the series connection of the leading rope 41 in the correct order, which is convenient to be folded and packed in the packing box. During assembling, only the corresponding drawstring member 4 are tightly fastened and matched with the single lock 32 or the ratchet lock 33 on the bottom member 3, thus the entire product has been assembled. The whole process is simple, fast, time-saving and labor-saving, so there will be no misplacement of the product components. Besides, the assembly cost of the product is reduced, which will save customers' money and improve customers' satisfactions.

Figure 9:
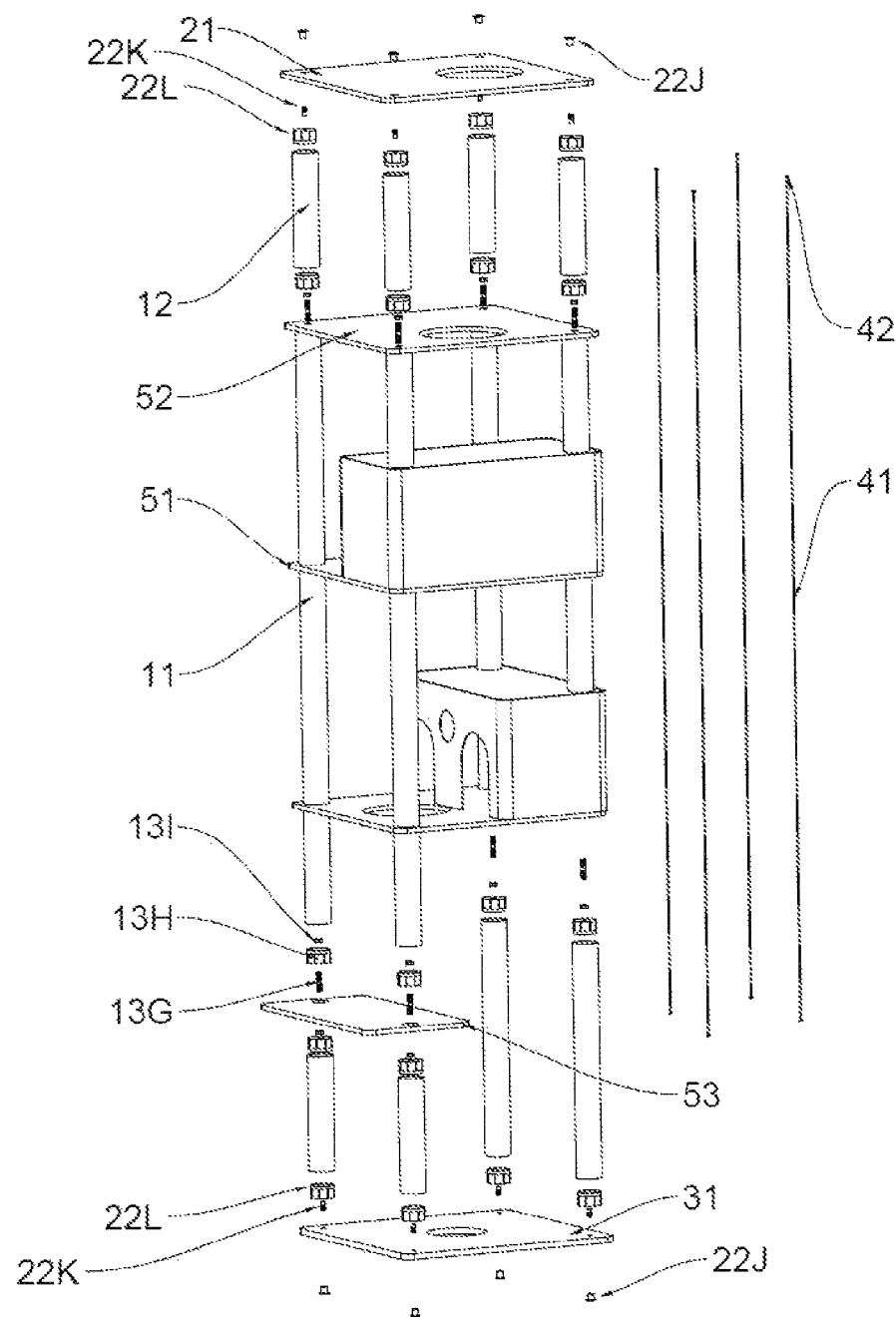
FIG. 9 is an exploded view of the assembled pet rack having fast disassembly and assembly according to another embodiment.

In one case of this embodiment, limiters 42 are arranged at both ends of the leading ropes 41. As shown in FIG. 9 and FIG. 10, the leading ropes 41 are used for connecting and guiding the overall structure. The leading ropes 41 can also be rubber bands or ropes of other materials that satisfy the usage requirements. During installation, one end of the leading rope 41 is first provided with the limiter 42 and then is connected with the top member 2, the other end of the leading rope 41 passes through the supporting member 1 and the separating member 5 and then is provided with another limiter 42 and next connected with the bottom member 3. The disassembly and assembly are fast, which save time and labors.

As shown in FIG. 9, as another preferred embodiment of the present disclosure, the bottom member 3 comprises: a bottom plate 31, and fixing units 22J arranged within the bottom plate 31 for fixing the drawstring member 4.

In one case of this embodiment, the bottom plate 31 is used for supporting at the bottom, and the drawstring member 4 is fixed by the fixing units 22J, which is convenient to operate.

As shown in FIG. 9, as another preferred embodiment of the present disclosure, the top member 2 comprises: a top plate 21, and fixing units 22J arranged within the top plate 21 for fixing the drawstring member 4.

In one case of this embodiment, the top plate 21 is used for supporting at the top, and the drawstring member 4 is fixed by the fixing unit 22J, which is convenient to operate.

As shown in FIG. 9 and FIG. 10, as another preferred embodiment of the present disclosure, the supporting member 1 comprises: a plurality of long tubes 11; a plurality of short tubes 12 for matching with the plurality of long tubes 11; and an assembled unit, which is a first intermediate connecting unit or a second intermediate connecting unit for connecting the long tubes 11 and the short tubes 12.

In one case of this embodiment, the plurality of long tubes 11 and the plurality of short tubes 12 are assembled through the assembled unit so as to ensure the stability during the connecting process. The plurality of long tubes 11 are matched with the plurality of short tubes 12 to assemble into pet climbing racks of different heights and styles. This embodiment just provides a conventional style of pet rack, and it can also be other styles, as long as it satisfies the usage requirements, and the specific assembled shapes are not limited here. The first intermediate connecting unit and the second intermediate connecting unit are in two connecting types, which are convenient to adjust the overall structure after assembly and are more practical.

As shown in FIG. 9, as another preferred embodiment of the present disclosure, the first intermediate connecting unit comprises: a hollow screw 13G; a first platen plug 13H sleeved outside both ends of the hollow screw 13G for matching with the long tubes 11 and the short tubes 12; and a sleeve nut 131 arranged on both ends of the hollow screw 13G and threadedly connected with the hollow screw 13G for fixing the first platen plug 13H.

Figure 11:
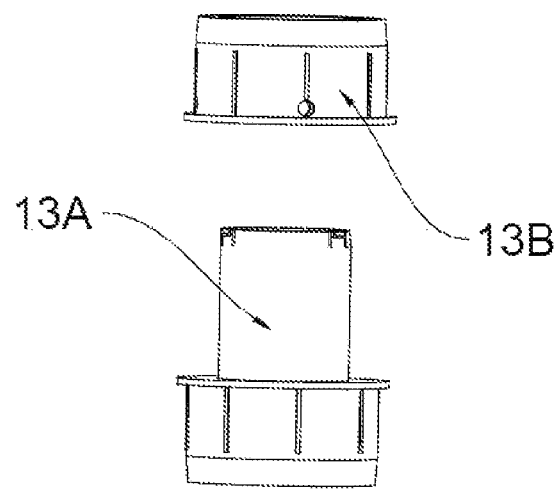
FIG. 11 is an exploded view of a straight connector of the assembled pet rack having fast disassembly and assembly.
Figure 12:
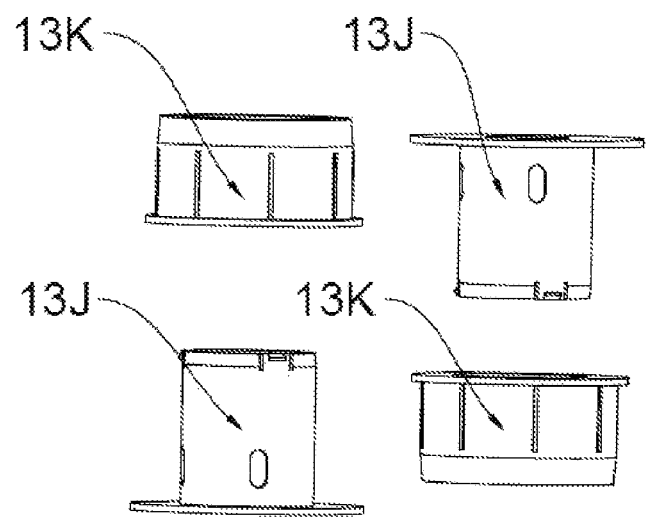
FIG. 12 is an exploded view of a turning connector of the assembled pet rack having fast disassembly and assembly.

As shown in FIG. 10 to FIG. 12, the second intermediate connecting unit comprises a straight connector for straight connection and a turning connector for turning connection, wherein the straight connector comprises: a male plug 13A, whose one end is matched with the separating member 5; and a female plug 13B, whose one end is matched with the male plug 13A. The turning connector comprises: a third turning plug 13J, whose one end is matched with the separating member 5; and a fourth turning plug 13K, whose one end is matched with the third turning plug 13J.

In one case of this embodiment, as shown in FIG. 9, the leading ropes 41 are rubber bands or ropes of other materials that satisfy the usage requirements. During installation, one end of the leading rope 41 is first provided with the limiter 42, the other end of the leading rope 41 passes through the fixing unit 22J (which can be a four-claw nut) arranged on the top plate 2 and then penetrates the following pre-installed structures respectively in sequence, that is: a hollow sleeve nut 22K, a fifth top plate plug 22L (the sleeve nut 22K and the fifth top plate plug 22L are sleeved together during production), the corresponding short tubes 12, and then is sleeved by the first platen plug 13H with a sleeve nut 131 (the sleeve nut 131 is injection-molded with the first platen plug 13H during production), next passed through the first separator 51 (or the second separator 53 or the third separator 52); matches the corresponding long tubes 11 and the short tubes 12 with the first platen plug 13H, and finally passes through the four-claw nut 22J arranged on the bottom plate 3. Lastly, the other end is also provided with another limiter 42. At this time, the entire product is in a semi-loose state but will not be scattered, which can be easily packed and transported. When assembling, only the corresponding leading ropes 41 are tightened and the corresponding components are tightened and clamped, thus the entire product has been assembled.

For another case of this embodiment, as shown in FIG. 10, the leading ropes 41 are rubber bands or ropes of other materials that satisfy the usage requirements, and all connecting units are engaged or threaded connections. First, one end of the leading rope 41 is connected to the limiter 42, then the other end of the leading rope 41 passes through in sequence the top plate plug reinforcement 22C, the first top plate plug 22A, the top plate 21, the second top plate plug 22B and each of the supporting members 1. When the supporting members 1 are in a straight structure, the female plug 13B and the male plug 13A are used for successively connecting and penetrating through the supporting members 1 and the separating members 5. When the supporting members 1 has a turning as shown in FIG. 10, please refer to FIG. 12 when the leading rope passes through. As shown in the FIG. 12, for the convenience of connection, the size and shape of the side-holes of the third turning plug 13J are subject to the passage of the leading rope 41 from the bottom surface of the separating member 5 during connection, and the bottom of the separating member 5 is also provided with a turning groove matched with the leading rope 41. When connecting, the leading rope 41 at the turning passes from top to bottom and passes through the side-holes on the fourth turning plug 13K and the third turning plug 13J in the middle, and then enters into the side-hole of the third turning plug 13J on the right and the fourth turning plug 13K on the right, and passes down sequentially, so as to achieve the turning, and finally another limiter 42 is arranged at the other end of the leading rope 41. At this time, the entire product is in a semi-loose state but will not be scattered, which can be easily packed and transported. When assembling, only the corresponding leading ropes 41 are tightened and the corresponding components are tightened and clamped, thus the entire product has been assembled. The whole process is simple, fast, time-saving and labor-saving, so there will be no misplacement of the product components. Besides, the assembly cost of the product is reduced, which will save customers' money and improve customers' satisfactions.

For the skilled in the art, it is obvious that the present disclosure is not limited to the details of the above exemplary embodiments, and the present disclosure can be realized in other specific forms without departing from the spirit or basic features of the present disclosure. Therefore, from any perspective, the embodiments should be considered as exemplary but not limited. The scope of the present disclosure is defined by the claims but not the specification above, so as to let the present disclosure include all the variation which falls in to the definition and the scope of the equivalent condition of the claims. Any drawings indicator in the claims should not be understood as the limitation to the protective scope.

In addition, it should be understood that, although the specification is described according to the embodiments, not each embodiment just includes an independent technical solution, and the description in the specification is only for the sake of clarity. Those skilled in the art should take the specification as a whole, and the technical solutions in each embodiment can also be appropriately combined to form other implementations that can be understood by those skilled in the art.

What is claimed is:

1. An assembled pet rack having fast disassembly and assembly, comprising:
    a bottom member;
    a top member;
    a supporting member, whose one end is connected with the bottom member, and the other end is connected with the top member;
    a separating member arranged on the supporting member for forming multiple spaces on the supporting member for pets to rest; and
    a plurality of drawstring members, whose one end is fixedly connected with the bottom member, and the other end penetrates the support member and the separating member and then is fixedly connected with the top member for integrally connecting the bottom member, the supporting member, the separating member and the top member; wherein the drawstring member further comprises a leading rope, whose one end or both ends are provided with a limiter;
    wherein the bottom member further comprises a bottom plate for supporting and a locking unit, and the locking unit is a single lock for locking the drawstring member individually or a ratchet lock for locking the plurality of drawstring member synchronously;
    wherein the single lock further comprises:
        a first bottom plate plug;
        a second bottom plate plug matched with the first bottom plate plug;
        a tension bolt arranged within the first bottom plate plug, wherein the tension bolt is matched with the drawstring member,
        an adjusting nut threadedly connected with the tension bolt for adjusting the tightness of the drawstring member through adjusting a position of the tension bolt; and
        a clamping nut sleeved outside the tension bolt and threadedly connected with the tension bolt for clamping the drawstring member;
    wherein the ratchet lock further comprises:
        a third bottom plate plug, whose side surface is provided with a plurality of guiding holes for the drawstring member to pass through;
        a fourth bottom plate plug matched with the third bottom plate plug;
        a bottom plate plug reinforcement member arrange within the third bottom plate plug for the drawstring member to pass through; and
        a locking member arranged within the bottom plate for cooperating with the drawstring member and tightening and fixing the drawstring member, wherein the locking member comprises:

a first base fixedly arranged within the bottom plate, wherein the first base is provided with a later guide rail;
a second base slidably connected to the first base through the lateral guide rail, wherein the second base is proved with a longitudinal guide rail;
a third base slidably connected to the second base through the longitudinal guide rail for laterally or longitudinally sliding relative to the first base;
a winder rotatably arranged between the second base and the third base, wherein the winder is connected to the limiter at one end of the leading rope;
a driving gear meshed with the winder, wherein the driving gear is rotatably arranged between the second base and the third base; and
a one-way rotary limiter matched with the winder, wherein the one-way rotary limiter is arranged between the second base and the third base for restricting the winder to rotate unidirectionally.

2. The assembled pet rack having fast disassembly and assembly according to claim 1, wherein the top member comprises:
a top plate; and
a top fixing unit arranged on the top plate, wherein the top fixing unit is a first fixer or a second fixer for fixing the drawstring member.

3. The assembled pet rack having fast disassembly and assembly according to claim 2, wherein the first fixer comprises:
a first top plate plug matched with the limiter;
a second top plate plug matched with the first top plate plug; and
a top plate plug reinforcement member arranged within the first top plate plug, wherein the top plate plug reinforcement member is connected to the limiter,
wherein the second fixer comprises:
a third top plate plug;
a fourth top plate plug matched with the third top plate plug;
a limiting connector arranged on the third top plate plug for cooperating with the drawstring member;
a pressing block fixedly connected with the limiting connector through a fixing screw; and
a plug cap matched with the third top plate plug, wherein when the limiting connector and the drawstring member are vertically connected but not laterally connected, the limiting connector lies flat on the third top plate plug; and when the limiting connector is laterally connected with the drawstring member and the pressing block is also pressedly connected with the drawstring member extending from another extended module, the limiting connector is erected and passes through inside of the third top plate plug under the action of the drawstring member at two ends.

4. The assembled pet rack having fast disassembly and assembly according to claim 1, wherein the supporting member comprises:
a plurality of long tubes;
a plurality of short tubes; and
an intermediate connecting unit for connecting the adjacent long tubes, the adjacent short tubes or the long tube and the short tube, wherein the intermediate connecting unit comprises:
a male plug;
a female plug matched with the male plug;

a first turning plug;
a second turning plug matched with the first turning plug;
a plurality of side-holes formed on side surface of the first turning plug;
a side-hole reinforcement member arranged within the side-holes; and
a turning plug reinforcement member arranged within the first turning plugs, wherein a side surface of the turning plug reinforcement member are provided with a through hole for the drawstring members to pass through and for guiding the drawstring members to turn.

5. The assembled pet rack having fast disassembly and assembly according to claim 4, wherein the separating member comprises:
a first separator installed between the adjacent long tubes;
a second separator installed between the adjacent short tubes;
a third separator installed between the long tube and the short tube.

6. The assembled pet rack having fast disassembly and assembly according to claim 1, wherein the bottom member comprises:
a bottom plate; and
fixing units arranged within the bottom plate for fixing the drawstring member,
wherein the top member comprises:
a top plate; and
the fixing units arranged within the top plate for fixing the drawstring member.

7. The assembled pet rack having fast disassembly and assembly according to claim 1, wherein the supporting member comprises:
a plurality of long tubes;
a plurality of short tubes for matching with the plurality of the long tubes; and
an assembled unit, which is a first intermediate connecting unit or a second intermediate connecting unit for connecting the long tubes and the short tubes.

8. The assembled pet rack having fast disassembly and assembly according to claim 7, wherein the first intermediate connecting unit comprises:
a hollow screw;
a first platen plug sleeved outside of both ends of the hollow screw for matching with the long tubes and the short tubes; and
a sleeve nut arranged on both ends of the hollow screw and threadedly connected with the hollow screw for fixing the first platen plug.

9. The assembled pet rack having fast disassembly and assembly according to claim 8, wherein the second intermediate connecting unit comprises a straight connector for straight connection and a turning connector for turning connection, wherein the straight connector comprises:
a male plug, whose one end is matched with the separating member; and
a female plug, whose one end is matched with the male plug,
wherein the turning connector comprises:
a third turn plug, whose one end is matched with the separating member; and
a four turn plug, whose one end is matched with the third turn plug.

* * * * *